United States Patent [19]
Pikor

[11] 3,839,006

[45] Oct. 1, 1974

[54] APPARATUS FOR CUTTING NOTCH SENSITIVE MATERIALS

[76] Inventor: Jerome W. Pikor, 2 Gerthmere Dr., West Hartford, Conn. 06110

[22] Filed: Mar. 1, 1973

[21] Appl. No.: 336,921

[52] U.S. Cl............................ 65/174, 65/105, 65/112
[51] Int. Cl............................................ C03b 33/06
[58] Field of Search ............ 65/105, 108, 112, 174, 65/175, 177

[56] References Cited
OTHER PUBLICATIONS
Procedures in Experimental Physics, pgs. 3, 8, 1944, New York, Prentice-Hall Inc. by J. Strong et al.

*Primary Examiner*—Arthur D. Kellogg

[57] ABSTRACT

A method of and apparatus for inducing heat shock in notch sensitive materials, such as glass, is disclosed. The apparatus includes a flexible resistance heater wire which may be applied to an article to be severed in overlying relationship to the desired fracture plane; the fracture plane usually being defined by a preconditioning step of scribing.

2 Claims, 4 Drawing Figures

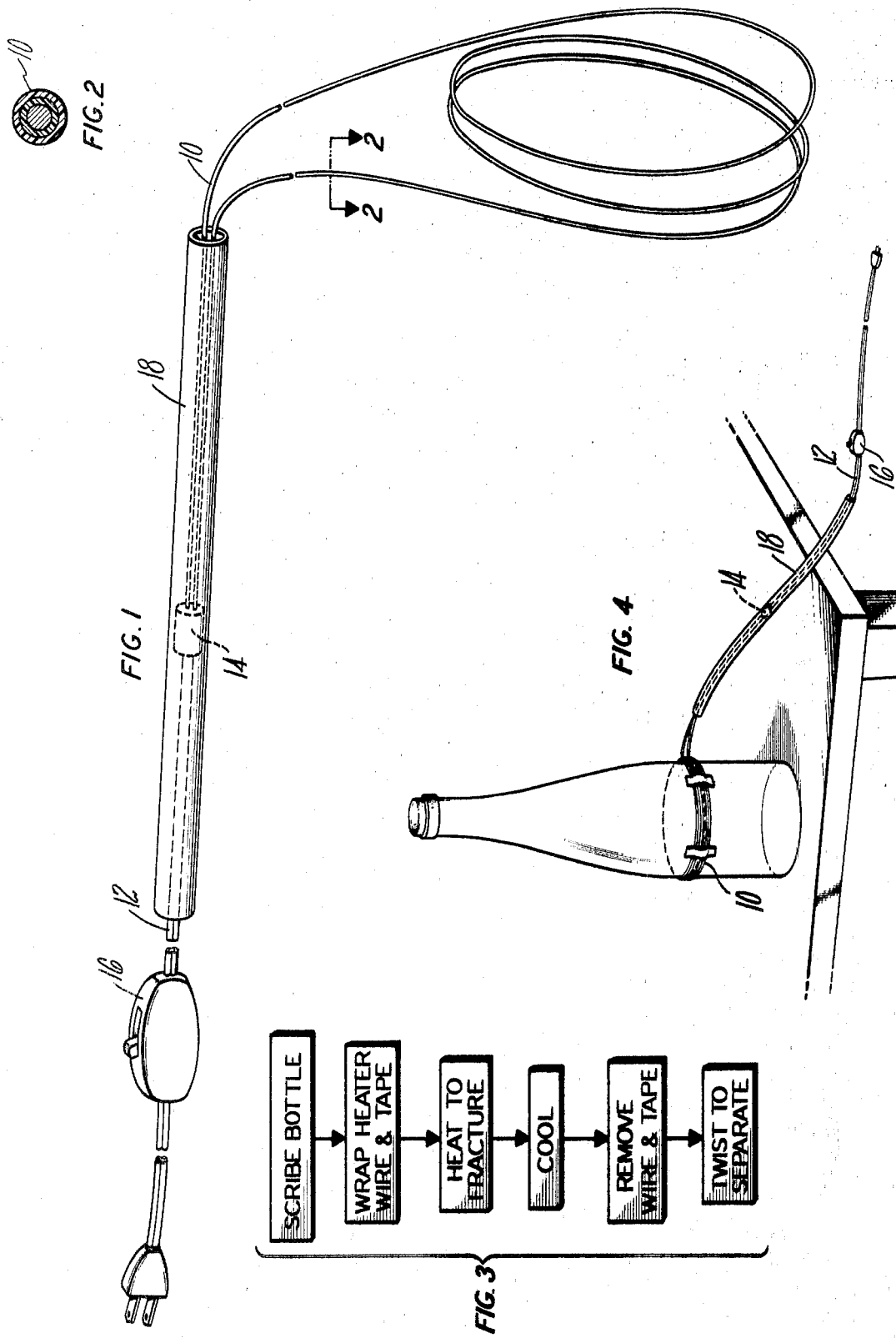

APPARATUS FOR CUTTING NOTCH SENSITIVE MATERIALS

BACKGROUND OF THE INVENTION

1. Field of the Invention

The present invention relates to the cutting of notch sensitive materials such as glass, which show a propensity upon loading to fracture in a brittle fashion without plastic flow. More specifically, this invention is directed to apparatus for electrically severing closed articles such as glass bottles and tubes either in their original state or after preconditioning as, for example, by scribing. Accordingly, the general objects of the present invention are to provide novel and improved methods and apparatus of such character.

2. Description of the Prior Art

While not limited thereto in its utility, the present invention is particularly well suited for application to the conversion of glass bottles to useful articles. Bottle cutting is one of the more popular of the craft activities in which intense interest has recently developed. All presently available bottle cutting equipment includes means for scribing the glass. The scribing introduces a fracture line along which forces induced in the amorphous material will concentrate. Theoretically, therefore, a glass article will fracture along the scribing line when a subsequent stressing step, for example a heat shock sequence, is performed. The heating step of the fracturing operation has previously typically been performed by heating the scribed article with a candle or by immersion in hot water and the quenching step, which results in the actual heat shock which promotes the fracture, will be performed by appication of ice or immersion in cold water. While the prior art heating-quenching operations are easy to perform and usually result in fracture of the scribed glass, irregular fracture has been common and the yield of usable articles has thus been notoriously poor.

The irregular fracture of a scribed glass article, which is often accompanied by glass splinters, may be attributed to an inability to exercise control over the shocking step. The incidence of irregular fracture will rise as a consequence of the fact that the inexperienced cutter will scribe a cut which is either too deep or too shallow. Restated, the obtaining of a clean fracture of a glass article such as a bottle requires skill and patience to perfect the technique of scribing the requisite shallow groove and to thereafter promote the actual fracture either by inducing heat shock as described above or by physically shocking the article by striking with a suitable tool.

SUMMARY OF THE INVENTION

The present invention overcomes the above briefly discussed and other deficiencies and disadvantages of the prior art by permitting the concentration of the heat applied to an article to be severed and particularly to an article comprised of a scribed notch sensitive material, in the interest of producing a thermal shock therein, to be concentrated along the desired fracture or scribing line. Apparatus in accordance with the invention comprises a flexible heater wire which may be wrapped around an article to be fractured and secured to the article in such a manner as to overlie a desired fracture plane. The heater wire of the present invention comprises an elongated and flexible electrical resistance heater protected by an insulation system comprising a layer of Teflon and a layer of fiberglass. The heater wire assembly may be also impregnated with silicone to improve its thermal conductivity. The present invention will employ a movable asbestos sleeve which will overlie a substantial portion of the length of the heater wire which is not wrapped around the object to be severed thereby preventing thermal damage to adjacent articles and surfaces.

A cutting technique in accordance with the invention usually, but not necessarily, contemplates the preconditioning of the article to be severed by scribing a line therein. Thereafter the heater wire is applied to the article, thermal shock induced by applying current to the heater wire and the article will thereupon fracture.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is a perspective view of a preferred embodiment of an electrical heating device for use in the cutting of glass articles in accordance with the present invention;

FIG. 2 is a cross-sectional view of the heater wire of the embodiment of FIG. 1;

FIG. 3 is a flow diagram representing the various steps of a bottle cutting procedure in accordance with the present invention; and FIG. 4 is a perspective view which illustrates use of the embodiment of FIG. 1 in accordance with the technique of FIG. 3.

DESCRIPTION OF THE PREFERRED EMBODIMENT

Referring now to the drawing, and particularly FIG. 1, the present invention includes a hermetically sealed heater wire 10 in the form of a loop which may be immersed in water without danger or damage. Heater wire 10, which will be described in greater detail below in the discussion of FIG. 2, is connected to a conventional A.C. line cord 12 by means of a connector 14. The two conductor cable or line cord 12 is provided, intermediate its length, with an on-off switch 16. The end of line cord 12 opposite to connector 14 is provided with s standard male connector 17. Current may be supplied to heater wire 10 by plugging connector 17 into the standard A.C. wall receptacle and thereafter closing switch 16. The heater of the preferred embodiment of the invention will also comprise a sleeve 18 of heat insulating material. Sleeve 18 may take the form of an asbestos, fiberglass or Teflon tube having an inner diameter in excess of the outer diameter of connector 14.

FIG. 2 depicts heater wire 10 in cross-section. In one embodiment of the invention heater wire 10 comprised an eight foot length of Nichrome wire having a diameter of .0071 inches. The Nichrome wire was inserted in a Teflon tube having an inner diameter commensurate with the diameter of wire and a wall thickness of .0001 inches. The Teflon insulated Nichrome wire was thereafter inserted in a woven fiberglass sleeve; a size 18 piece of fiberglass tubing being employed in the embodiment being described. After assembly of the wire and two coaxial tubes, the entire heater wire assembly was impregnated with silicone to improve its thermal conductivity.

FIGS. 3 and 4 pertain to a bottle cutting technique in accordance with the invention. The first step in accordance with the invention will generally be the scribing of the bottle, in accordance with techniques well known in the art, in order to define the desired fracture plane. While there is a notable exception which will be discussed briefly below, if the bottle is not scribed the heating step will result in cracking in an irregular fashion or pattern.

Subsequent to scribing, the heater wire 10 is wrapped around the bottle over the scribed line as shown and taped to the bottle at a minimum of two points by means of a suitable pressure sensitive adhesive tape. When using the present invention to sever a scribed bottle it has been found that a minimum of two wraps of heater wire 10 around the bottle are necessary.

With the heater wire taped to the bottle as shown in FIG. 4, the bottle is positioned on a table or other suitable stand and the sleeve 18 is positioned so that there will be no contact between wire 10 and the surface of the stand. The sleeve is thus functions as a safety device to prevent marring of the surface of a stand on which the bottle is placed during the heating step.

With sleeve 18 positioned as shown in FIG. 4, current is applied to heater wire 10 and heating is continued until a fracture of the glass occurs. The fracture will be audible and will usually occur at the pressure points where heater wire 10 is most tightly held against the scribe line. These pressure points will usually be directly beneath the pressure sensitive tape or any other device, such as a spring clamp, which may be employed to hold the heater wire firmly against the bottle.

When fracture is detected, switch 16 will be opened and the heater wire will be permitted to cool. The cooling step will take a short time only; a 30 second cooling being typical. After the heater wire has cooled sufficiently it will be removed from the bottle. With the heater wire removed, clean separation of the two portions of the bottle along the scribe line may be achieved merely by twisting the two portions of the bottle slightly with respect to one another. Experience has shown that use of the present invention, when compared to prior art techniques of generating percussive forces or heating followed by quenching, produces a much higher yield. In addition, since irregular fracture is much less apt to occur using the present invention, injury due to glass splinters is greatly reduced. The improved yield and enhanced safety obtained when employing the present invention results from the ability to concentrate the applied heat to the scribe line.

As discussed above, the customary manner of employing the present invention calls for the bottle to be scribed and thereafter heated along the scribe line using a plurality of turns of heater wire 10 wrapped about the bottle. It is also possible to employ the present invention to directly sever the bottle without the preliminary scribing step. Such direct cutting will be performed using a single turn only of heater wire 10.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for inducing heat shock in a highly localized region of an article formed of a notch sensitive material comprising:

a single elongated flexible wire, said wire being comprised of a conductive material having sufficient electrical resistance to preclude establishment of a short circuit and to cause the generation of a substantial amount of heat upon the connection of the opposite ends thereof to a current source, said wire being of sufficient length to permit it to be passed at least twice around an article;

an insulating system covering said wire, said insulation system being capable of maintaining its electrical isolation properties at the elevated temperatures resulting from the passage of current through said wire whereby the short circuiting of adjacent turns of said wire is prevented, said insulation system comprising a layer of polytetrafluoroethylene and a layer of woven fiberglass;

means for selectively applying electric current to said wire, said current applying means establishing electrical contact with the oppositely disposed ends of said wire; and a movable sleeve of thermal insulating material, both ends of said wire passing through said sleeve, said sleeve being positionable in contact with objects juxtapositioned to the article in which heat shock is to be induced to protect such objects from damage during the application of current to said wire.

2. The apparatus of claim 1 wherein said means for selectively applying current to said resistance wire comprises:

means including a two-conductor electrical cable for making contact with an alternating current source;

means for connecting said cable to opposite ends of said resistance wire; and switch means interposed in said cable for selectively interrupting the flow of alternating current to said resistance wire.

* * * * *